Aug. 26, 1952  L. A. BAIN, JR., ET AL  2,608,539
METALLIZED CERAMIC COATING COMPOSITION
Filed March 22, 1950
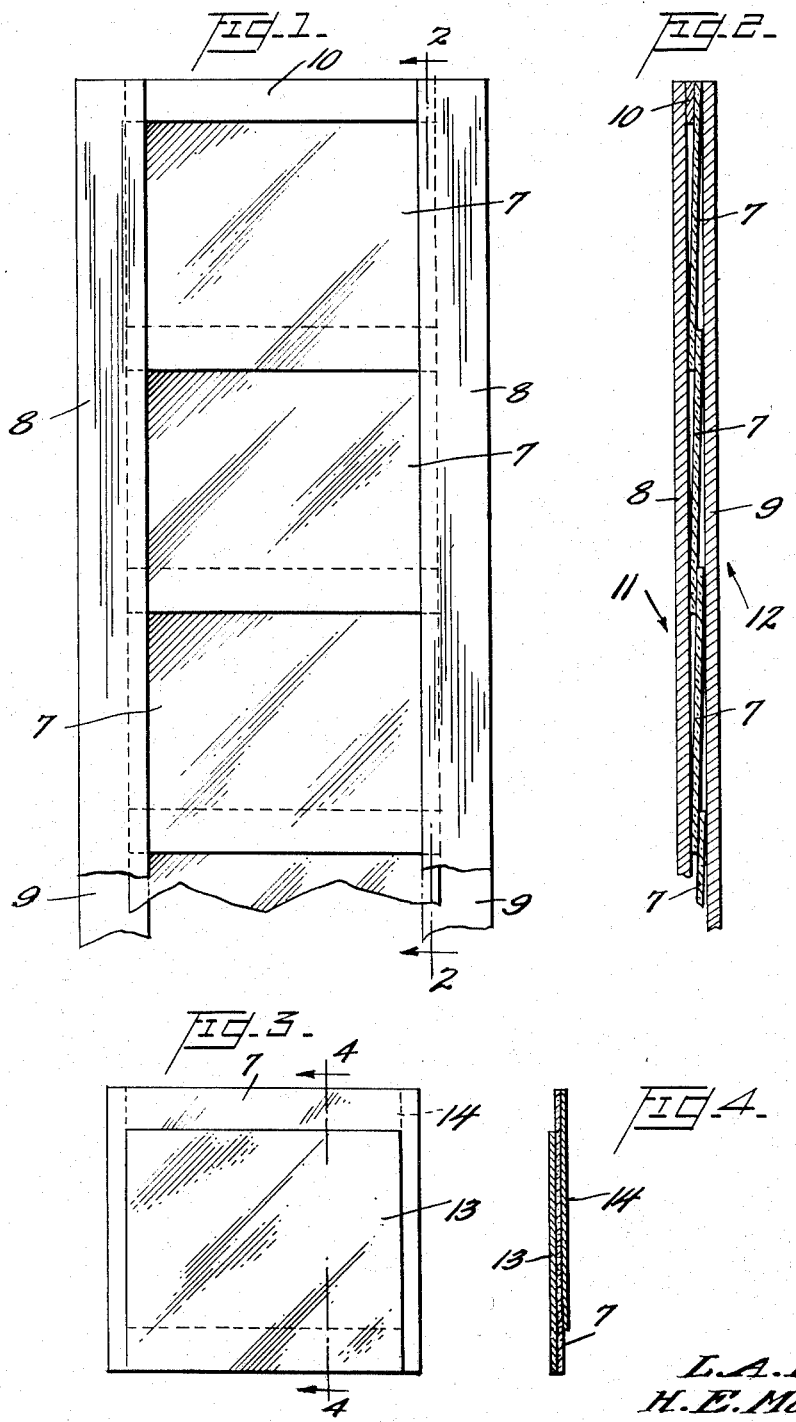
INVENTORS
L. A. Bain, Jr.
H. E. Malone,
BY
C. B. Hamilton
ATTORNEY Patented Aug. 26, 1952

2,608,539

UNITED STATES PATENT OFFICE 2,608,539

METALLIZED CERAMIC COATING COMPOSITION

Lewis A. Bain, Jr., Berwyn, and Herbert E. Malone, Riverside, Ill., assignors to Western Electric Company, Incorporated, New York, N. Y., a corporation of New York Application March 22, 1950, Serial No. 151,196

10 Claims. (Cl. 260—22)

This invention relates to a coating composition for forming a conductive coating on a dielectric base, and more particularly to a composition for forming a metallic coating on a dielectric base such as on mica, ceramic or crystalline bases.

In the manufacture of condensers for electrical apparatus, sheets of mica coated with a metallic composition may be assembled in stacks in such manner that the mica serves as a dielectric between the coatings, which, in turn, serve as the plates of the condenser. In the past, numerous methods have been devised for coating mica for use in such condensers, but difficulty has been experienced in the devising of proper solutions to use as coating materials since materials which may readily be sprayed upon the mica deteriorate on aging, do not form sufficiently rugged coatings that will satisfactorily withstand handling during processing, and do not form extremely thin films with adequate electrical conductivity.

It is an object of the present invention to provide a silver coating composition which may readily be applied to dielectric sheets to provide thin even metallic coatings on the sheets.

Another object is to provide a composition which will air dry rapidly to a tough film, which will give complete coverage of the coated object with a minimum of silver, and which will provide a coating having good electrical conductivity.

In accordance with one embodiment of the invention, a composition suitable for spray coating mica laminations is provided which comprises silver flake and lead-boro-silicate in a suitable vehicle, which will rapidly dry in air and will burn off when the laminations are later subjected to a temperature sufficient to fuse the lead-boro-silicate and form a metallic conducting coating on the mica, which coating consists predominantly of silver bound together by the glass formed from melting the lead-boro-silicate. The preferred form of vehicle comprises an oil modified alkyd resin in a solvent to which has been added a dispersion agent.

Another species of the invention is described and claimed in a co-pending application by the same inventors, Serial No. 610,844, filed August 14, 1945, which application issued May 2, 1950, as United States Patent No. 2,506,130. In the prior application a dispersing agent for the silver flakes is formed in situ by a reaction between a stearic acid coating on the silver flakes and triethanolamine to form an organic solvent soluble soap, which soap is an emulsifying agent. This emulsifying agent aids in causing any agglomerates of the silver flakes to break up easily and distribute themselves uniformly over the surfaces of the mica sheets. The present application is a continuation-in-part of the prior application and deals with the formation of a conductive coating on a dielectric base without the use of an emulsifying agent.

A complete understanding of the invention may be had by reference to the following detailed description when considered in conjunction with the accompanying drawing wherein there is illustrated the method of coating portions of the surfaces of the mica sheets, and wherein:

Fig. 1 is a face view of a plurality of sheets of mica assembled between cooperating strips of metallic masking material prior to the spraying of the sheets with the silver composition;

Fig. 2 is a vertical sectional view taken substantially along the line 2—2 of Fig. 1 in the direction of the arrows;

Fig. 3 is a plan view of one of the mica sheets after it has been coated with the silver composition; and Fig. 4 is a sectional view taken substantially along the line 4—4 of Fig. 3 in the direction of the arrows showing the layers of silver on the mica sheet.

In the drawings, the thickness of the various elements has been materially exaggerated to facilitate the illustration of these parts. For example, the mica sheets which are to be coated are usually approximately .001" thick.

In the process of manufacturing these condenser elements, a plurality of sheets or laminations 7—7 of mica are positioned between copper masking strips 8—8 and 9—9, on which there has been deposited a mineral wax which acts to fix the mica sheets 7 in position with their edges masked under the copper tapes or strips 8 and 9. The upper mica sheet 7 of the assemblage has a strip of masking material 10 along its upper edge and the succeeding sheets are overlapped by the sheet next adjacent them to mask the front upper edge of each sheet of mica, whereas the lower rear edge of each sheet of mica will be masked by the next adjacent lower sheet 7 at the back of the assemblage. The bottom of the assemblage may be masked similarly to the upper end, except that the masking material 10 is placed at the rear of the assemblage, as shown in Fig. 1, the right hand side as shown in Fig. 2. After the mica sheets 7 have been assembled in this manner, a suitable silver composition may be sprayed thereon by directing a spray thereof in the directions indicated by the arrows 11 and 12, whereby there will be no tendency for the composition, when it is sprayed on the mica sheets 7, to get under the masking sections of the mica sheets or the masking tapes.

The silver composition comprising the preferred embodiment of the present invention is composed of a silver flake material mixed with lead-boro-silicate and carried in a fast drying vehicle which will air dry in a short period of time and which, upon being slowly heated to a temperature sufficiently high to fuse the lead-boro-silicate, will be completely volatilized out of the composition without igniting.

The preferred vehicle comprises a drying oil modified type alkyd resin, such as a linseed oil modified alkyd resin, in a suitable solvent. Oil modified alkyd resins have been found to be superior to other binders, such as nitro-cellulose or phenolic resins, because such alkyl resins may be eliminated completely during a firing operation without volatilizing so rapidly that blisters would be raised, which blisters would tend to separate the coating from the mica base.

A suitable solvent for the oil modified alkyd resin is a mixture of xylene and toluene. Other equivalent solvent mixtures may be devised. It has been found that the material known commercially as "Enn Jay No. 1" which is a petroleum derived hydrocarbon solvent with a boiling range between 135° C. and 177° C. and composed mostly of aromatic compounds, is a suitable toluene equivalent and that solvent naphtha is a suitable xylene equivalent.

The alkyd resin, being a fast-drying oil modified type such as a linseed oil modified resin or its equivalent, polymerizes readily, particularly in the presence of silver, which is a catalyst. Therefore, it has been found advisable to add butyl alcohol to the solution to act as a solvent and to retard the polymerization of the resin. It appears that butyl alcohol reacts with the resin components to form a soluble resin.

The silver ordinarily available comprises metallic silver flakes having a surface coating of approximately 1.5% by weight of stearic acid. This may be prepared by ball-milling stearic acid and silver particles together with a mineral spirits solvent to form silver flakes coated with the stearic acid, whereupon the composition may be allowed to dry to remove the solvent. Such flakes of silver may be approximately one micron thick and fifty microns in diameter.

A preferred form of lead-boro-silicate is the ternary compound 5 PbO.SiO$_2$.B$_2$O$_3$. This compound forms a very low melting point glass which fuses on the mica sheets without damage to them, and which has a coefficient of expansion similar to that of the mica.

The silver flake and lead-boro-silicate in powder form may be mixed with the other ingredients of the composition in the following proportions:

|  | Percentage by Weight | | |
| --- | --- | --- | --- |
|  | From | To | Preferably |
| Silver flake, with or without stearic acid coating | 40 | 60 | 45.0 |
|  |  | 60 |  |
| Lead-boro-silicate | 2 | 6 | 2.3 |
|  |  | 6 |  |
| Alkyd resin, fast air-drying linseed oil modified type | 4 | 15 | 4.5 |
|  |  | 15 |  |
| Butyl alcohol | 3 | 6 | 3.4 |
|  |  | 6 |  |
| Triethanolamine | 0 | 1 | 0 |
|  |  | 0 |  |
| Xylene, or its equivalent | 17 | 4 | 16.3 |
|  |  | 5 |  |
| Toluene, or its equivalent | 34 | 8 | 28.5 |
|  |  | 8 |  |
| Total | 100 | 100 | 100.0 |
|  |  | 100 |  |

In the mixing of these ingredients, the alkyd resin, lead-boro-silicate and silver flake are first mixed in a ball mill together with the butyl alcohol and solvent naphtha with approximately one-third of the toluene and, after these have been thoroughly mixed, the balance of the toluene is added to the mixture and mixed therewith.

After the mixture has been prepared, it may be sprayed upon the sheets of mica 7 assembled in the masking strips 8 and 9 by directing the spray in the directions shown by the arrows 11 and 12, and, after allowing the coating material to air dry for approximately five minutes, the assembled sheets and masking strips may either be passed through a conveyor type furnace or placed in a box type furnace and raised to a temperature of 1000° F. to 1100° F. and maintained at that temperature for approximately two to five minutes. In the air drying of the coating, the solvents volatilize and in the firing operation, the alkyd resin volatilizes out prior to the melting of the lead-boro-silicate. Since the mineral wax and alkyd resins are not miscible, the silver composition will be deposited over the entire exposed area of the mica sheets, but will not tend to seep under the masking strips. The mineral wax, of course, will be burned or volatilized out in the furnace, and as soon as the coated mica sheets cool to a temperature below the melting point of the glass, the assemblages of sheets and masking strips may be removed from the furnace and the masking strips may be pulled from the mica, thus providing condenser members as shown in Figs. 3 and 4, wherein the silver coatings 13 and 14 extend to opposite edges of the sheet of mica on opposite sides thereof.

It is to be understood that the above-described arrangements are simply illustrative of the application of the principles of the invention and that numerous other arrangements may be readily devised by those skilled in the art which will embody the principles of the invention and fall within the spirit and scope thereof.

What is claimed is:

1. A composition for forming an electrically conductive coating on dielectric sheets consisting of:

|  | Percent by weight |
| --- | --- |
| Silver particles | 40 to 60 |
| Lead borosilicate | 2 to 6 |
| Oil modified alkyd resin | 4 to 15 |
| Solvent for the alkyd resin | 54 to 19 |

2. A composition for forming an electrically conductive coating on dielectric sheets consisting of:

|  | Approximate Percent by weight |
| --- | --- |
| Silver particles | 45.0 |
| Lead borosilicate | 2.3 |
| Oil modified alkyd resin | 4.5 |
| Solvent for the alkyd resin | 43.2 |

3. A composition for forming an electrically conductive coating on dielectric sheets consisting of:

|  | Percent by weight |
| --- | --- |
| Silver particles | 40 to 60 |
| Lead borosilicate | 2 to 6 |
| Oil modified alkyd resin | 4 to 15 |
| Butyl alcohol | 3 to 6 |
| Solvent for the alkyd resin | 51 to 13 |

4. A composition for forming an electrically conductive coating on dielectric sheets consisting of:

|  | Approximate percent by weight |
|---|---|
| Silver particles | 45.0 |
| Lead borosilicate | 2.3 |
| Oil modified alkyd resin | 4.5 |
| Butyl alcohol | 3.4 |
| Solvent for the alkyd resin | 44.8 |

5. A composition for forming an electrically conductive coating on dielectric sheets consisting of:

|  | Percent by weight |
|---|---|
| Silver flakes | 40 to 60 |
| Lead borosilicate | 2 to 6 |
| Oil modified alkyd resin | 4 to 15 |
| Butyl alcohol | 3 to 6 |
| Xylene | 17 to 5 |
| Toluene | 34 to 8 |

6. A composition for forming an electrically conductive coating on dielectric sheets consisting of:

|  | Approximate percent by weight |
|---|---|
| Silver flakes | 45.0 |
| Lead borosilicate | 2.3 |
| Oil modified alkyd resin | 4.5 |
| Butyl alcohol | 3.4 |
| Xylene | 16.3 |
| Toluene | 28.5 |

7. A composition for forming an electrically conductive coating on dielectric sheets consisting of:

|  | Percent by weight |
|---|---|
| Silver flakes | 40 to 60 |
| Lead borosilicate, low melting point | 2 to 6 |
| Drying oil modified alkyd resin | 4 to 15 |
| Butyl alcohol | 3 to 6 |
| Solvent selected from the group consisting of xylene and solvent naphtha | 17 to 5 |
| Solvent selected from the group consisting of toluene and petroleum derived aromatic hydrocarbon with a boiling range between 135° C. and 177° C. | 34 to 8 |

8. The composition of claim 7 in which the drying oil modified alkyd resin is a linseed oil modified alkyd resin.

9. A composition for forming an electrically conductive coating on dielectric sheets consisting of:

|  | Percent by weight |
|---|---|
| Silver flakes | 40 to 60 |
| Lead borosilicate, low melting point | 2 to 6 |
| Linseed oil modified alkyd resin | 4 to 15 |
| Butyl alcohol | 3 to 6 |
| Solvent selected from the group consisting of xylene and solvent naphtha | 17 to 5 |
| Solvent selected from the group consisting of toluene and petroleum derived aromatic hydrocarbon with a boiling range between 135° C. and 177° C. | 34 to 8 |

10. A composition for forming an electrically conductive coating on dielectric sheets consisting of:

|  | Approximate percent by weight |
|---|---|
| Silver flakes | 45.0 |
| Lead borosilicate, low melting point | 2.3 |
| Linseed oil modified alkyd resin | 4.5 |
| Butyl alcohol | 3.4 |
| Solvent selected from the group consisting of xylene and solvent naphtha | 16.3 |
| Solvent selected from the group consisting of toluene and petroleum derived aromatic hydrocarbon with a boiling range between 135° C. and 177° C. | 28.5 |

LEWIS A. BAIN, JR.
HERBERT E. MALONE.

REFERENCES CITED

The following references are of record in the file of this patent:

UNITED STATES PATENTS

| Number | Name | Date |
|---|---|---|
| 2,385,580 | Knox | Sept. 25, 1945 |
| 2,461,878 | Christensen et al. | Feb. 15, 1949 |
| 2,506,130 | Bain et al. | May 2, 1950 |

OTHER REFERENCES

Mattiello, "Protective and Decorative Coatings," John Wiley and Sons, N. Y., 1942, vol. 2, page 587.